July 16, 1963

D. J. JAY ETAL 3,097,718

SUPPORT SYSTEM

Filed June 25, 1958

D. J. JAY
H. W. PEITHMAN
INVENTORS

BY E. C. McRae
J. R. Faulkner
J. H. Oster
K. L. Jeroschling

ATTORNEYS

July 16, 1963

D. J. JAY ETAL 3,097,718

SUPPORT SYSTEM

Filed June 25, 1958

D. J. JAY
H.W. PEITHMAN
INVENTORS

BY
ATTORNEYS

United States Patent Office 3,097,718
Patented July 16, 1963

3,097,718
SUPPORT SYSTEM
David J. Jay, Detroit, and Harlan W. Peithman, Livonia, Mich., assignors to Ford Motor Company, Dearborn, Mich., a corporation of Delaware
Filed June 25, 1958, Ser. No. 744,416
6 Claims. (Cl. 180—7)

This invention relates to a support system and more particularly to a gas pressure levitation support system which is capable of supporting an object in spaced relationship from a surface in a substantially vibrationless condition.

The present invention contemplates a plurality of gas pressure levitation devices affixed to a means for supporting some type of object, such as cargo or human beings. Each of the devices is provided with a member having a plurality of nozzles positioned therein terminating at a substantially flat surface which is positioned upon another surface, for example a roadway or rail system. A compressed gas is supplied to the nozzles. As the gas leaves the nozzles, it forms a thin layer of gas under pressure between the substantially flat surface of each of the devices and the surface upon which the object is to be supported. This pressure supplies a force which separates or raises the flat surface of each of the devices a short distance, for example a few thousandths of an inch, from the supporting surface, that is, the roadway or rails.

It has been found that the gas pressure devices of the present invention are stable, that is they support the load in a substantially vibrationless condition over a wide range of loads when sonic flow conditions exist in the immediate vicinity of the nozzles. There are, however, certain stable ranges of operation utilizing sub-sonic flow conditions but since the load on the gas pressure levitation system may vary over a wide range, as cargo and passengers are loaded or discharged, it is preferred to operate the devices so that the above mentioned sonic flow conditions exist.

An object of the present invention is the provision of a gas pressure levitation device.

Another object of the invention is to provide a gas pressure levitation system comprised of a plurality of the above mentioned devices for supporting an object in spaced relationship from a surface.

A further object of the invention is the provision of a gas pressure levitation device and system which is free from vibration over a wide range of loads.

Still another object is the provision of a gas pressure levitation device which is capable of traversing a surface which has irregularities located therein.

Other objects and attendant advantages of the present invention will become more apparent as the specification is considered in connection with the accompanying drawings in which.

Figure 1:
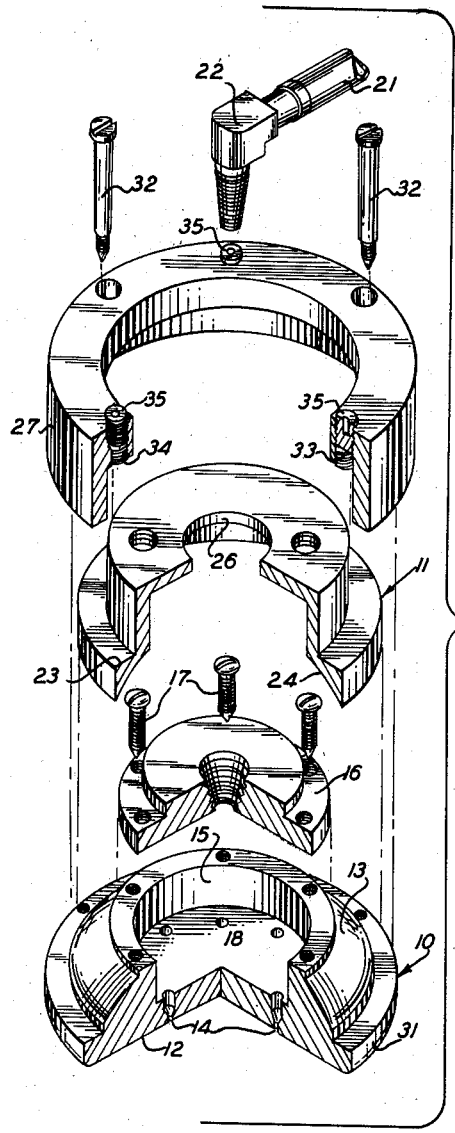
FIGURE 1 is an exploded view of the gas pressure levitation device of the present invention.
Figure 2:
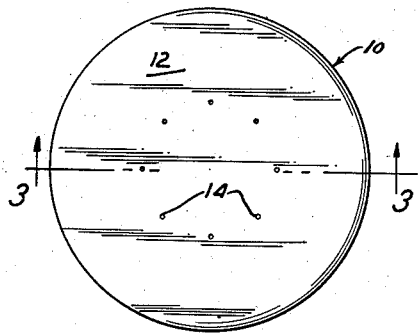
FIGURE 2 is a bottom plan view of the gas pressure levitation device.
Figure 3:
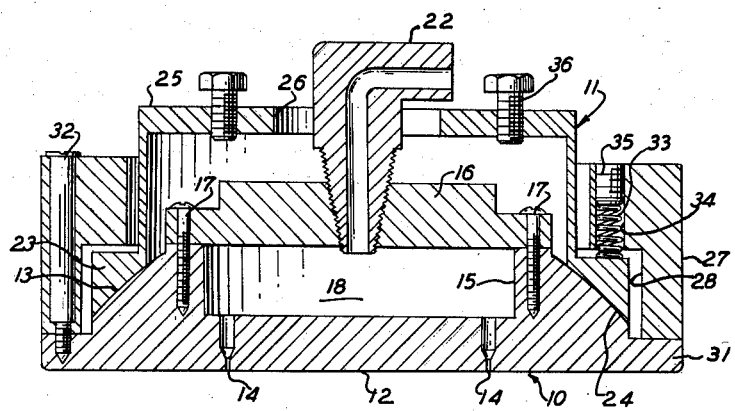
FIGURE 3 is a cross sectional view taken along the lines 3—3 of FIGURE 2.

Referring now to the drawings in which like reference numerals designate like parts throughout the several views thereof, there is shown in FIGURES 1 through 3 a gas pressure levitation device comprising a first main member 10 and a second main member 11. The first main member has a substantially flat bearing surface 12, and a curved bearing surface 13, preferably of spherical configuration. This member has a plurality of nozzles 14 positioned therein which terminate at the substantially flat surface 12 and which are arranged on the circumference of an imaginary circle located on said flat surface. Suitable means are provided for supplying a compressed gas to each of the nozzles 14 which preferably comprises a recess 15 formed in the member 10 with a cover plate 16 covering one end thereof and being affixed to the member by any suitable means, for example, screws 17 to form a manifold 18. The manifold 18 is supplied from a source of gas under pressure (not shown) by means of conduit 21 and fitting 22 which is suitably threaded through the cap 16.

The second main member 11 is provided with an enlarged flanged portion 23 at one end thereof which has a curved bearing surface 24, preferably spherical in configuration, and complementary to the bearing surface 13 of the first main member 10. The end wall 25 of the member 11 has an aperture 26 positioned therein of sufficient diameter to permit the two main members 10 and 11 to move relative to each other on their bearing surfaces 13 and 24 without interference.

A collar 27 having an undercut portion 28 to receive the bearing surfaces 13 and 24 of the two members 10 and 11 respectively, is positioned in spaced relationship around the second member 11 and is affixed to a flange 31 of the main member 10 through any suitable means, for example, screws 32. This member is dimensioned so that unrestricted movement of the member 10 with respect to the member 11 may take place about the bearing surfaces 13 and 24. Suitable means may be employed for urging the two bearing surfaces 13 and 24 together and preferably takes the form of a plurality of springs 33 positioned in bores 34 of the collar 27. The tension on the springs may be adjusted to a desired value by adjustment of screws 35 which are threadingly received in the bores 34.

The second main member 11 is affixed to a suitable object supporting device by means of suitable fasteners as shown at 36. The object supporting device may take the form of a frame system composed of structural angle sections 42, 43 and 44 (FIGURE 4) affixed to a platform 45 (FIGURE 5) with the member 11 of each of the devices affixed to the angle structural sections as shown. The platform shown in FIGURE 5 was specifically designed to support one or more people and is provided with a pair of handle bars 46 for guidance.

Figure 4:
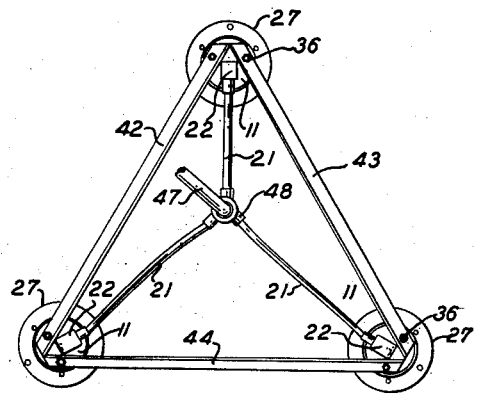
FIGURE 4 shows a gas pressure levitation system in which a plurality of the gas pressure levitation devices of FIGURES 1 through 3 are mounted on a frame; and, FIGURE 5 is a perspective view of a practical device capable of supporting an object and which utilizes the suspension system of FIGURE 4.
Figure 5:
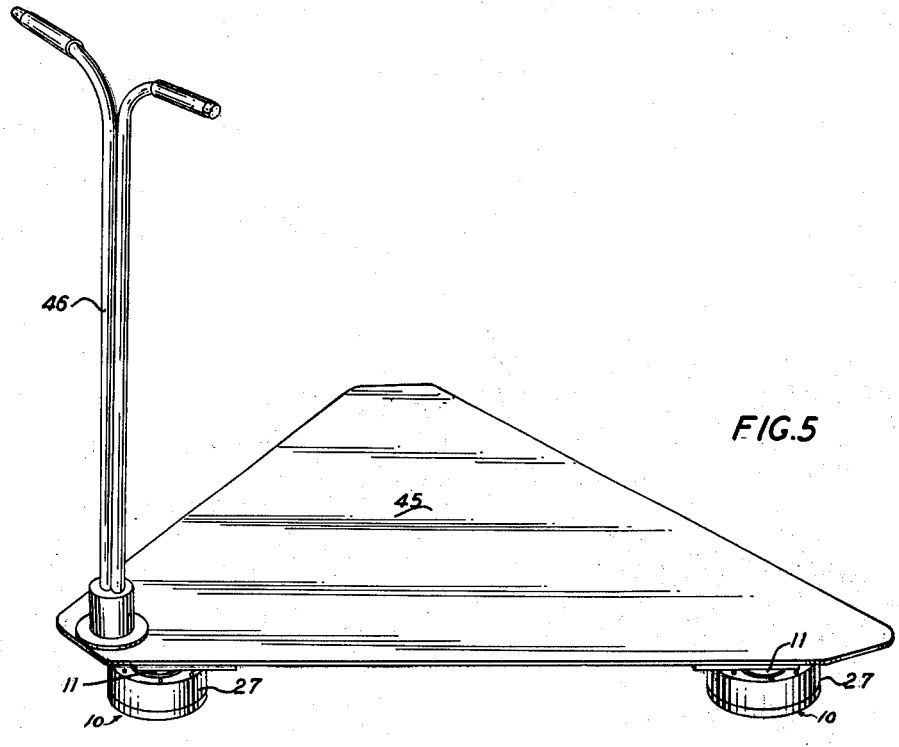

Referring now to FIGURE 4, a source of compressed gas (not shown) is attached to a conduit 47 which leads into a distribution head 48 to which the conduits 21 of each of the gas pressure levitation devices is connected. Thus, when gas under pressure is supplied from the source through conduits 47, distribution head 48, conduits 21, fittings 22 and manifolds 18 to the nozzles 14 of each of the gas pressure levitation devices, the pressure created between the surface upon which the system is supported and each of the substantially flat surfaces 12 will raise the device shown in FIGURE 5, together with its load a few thousandths of an inch off the surface. Thus, there is substantially no friction between the substantially flat surfaces 12 of the device and the surface upon which the devices are supported as there is a thin film of gas under pressure positioned between the two surfaces. It is readily apparent that once the device of FIGURE 5 is supported a few thousandths of an inch from the surface under substantially frictionless conditions, only a small amount of power would be necessary to move the device along the surface. This power may be supplied by a human being for moving small loads such as those which are capable of being supported by the platform shown in FIGURE 5, or with larger devices which could carry numerous passengers or a large amount of cargo, some other suitable motive power means, such as ducted fans or jet engines may be employed.

Referring now to FIGURE 3, it can readily be realized that a suitable gasket or other sealing material is necessary between the member 10 and the cover 16 to seal the manifold 18 against gas pressures that are present when the system is in operation. Also, a suitable lubricant may be employed between the bearing surfaces 13 and 24 not only to reduce friction and wear but also to damp out vibrations which may occur as the result of the member 10 encountering surface irregularities.

Although the gas pressure levitation system may be operated with a wide range of pressures and loads, it is preferred to operate with sufficient gas pressure to create sonic velocities in the immediate area of the nozzles 14. When operation is such that sonic velocities are not achieved in the immediate vicinity of the nozzles, the system may be stable, that is, substantially vibrationless under certain conditions of loading and gas pressure; however, to assure substantially vibrationless conditions over a wide range of loads, sonic velocities should be established in the immediate vicinity of the nozzles.

Although the invention is by no means so limited, the following examples illustrate an embodiment in which sonic velocities are achieved in the immediate vicinity of the nozzles 14 to obtain substantially vibrationless operating conditions. These examples are applicable to the physical embodiment illustrated in the drawings.

| | |
|---|---|
| Number of gas pressure levitation devices | 3 |
| Diameter of the gas pressure levitation device in | 5 |
| Number of nozzles per gas pressure levitation device | 8 |
| Diameter of the nozzles at the smallest point in | 0.040 |
| Diameter of the nozzle ring in | 2.062 |
| Spherical radius of the spherical bearing surfaces in | 2.87 |

*Conditions for Two Supply Pressures at a Constant Load of 350 Pounds*

| | | |
|---|---|---|
| Supply Pressure, p.s.i.g. | 80 | 60 |
| Wt. Flow of Gas (Air) lb./sec. (Distributed among the three devices) | 0.043 | 0.031 |
| Gap, inches, between the flat surfaces 12 and the surface on which system is supported | 0.005 | 0.004 |
| Horsepower supplied to a compressor operating at 60% overall system efficiency | 9.1 | 5.5 |
| Horsepower Per Ton of Load | 52.0 | 31.5 |

It can be appreciated from the above data that the substantially flat surfaces 12 of the gas pressure devices are separated from the surface upon which the load is to be supported by a film of gas under pressure of only a few thousandths thickness, i.e., 0.005" and 0.004" for supply pressures of 80 p.s.i.g. and 60 p.s.i.g. respectively. Under these conditions, relatively little power is required to leviate a given load, 52.0 horsepower per ton and 31.5 horsepower per ton for 80 p.s.i.g. and 60 p.s.i.g. respectively. It will be noted too that as the pressure is decreased, the gap between the flat surfaces 12 and the supporting surface such as a floor, roadway, or rails is decreased, and simultaneously the horsepower required to levitate a given load decreases. The exact operating point, that is, the pressure supplied to the nozzles is a function of the gap that can be tolerated which in turn is a function of the roughness of the surface over which the system is to be moved.

It can readily be appreciated that if the substantially flat surfaces 12 of each of the gas pressure levitation devices were rigidly attached to the frame device of FIGURES 4 and 5, any surface irregularities which would tilt one of the surfaces would tilt all of the surfaces with a corresponding reduction in the load carrying capacity of each of the devices. To obviate this difficulty, the spherical bearing surfaces 13 and 24 are provided on each of the devices, with the bearing surface 13 being positioned on the member which includes the substantially flat surface 12 and with the bearing surface 24 being positioned on the member which is attached to the frame. This permits each of the flat surfaces 12 to be tilted with respect to each other so that the plane of each of the surfaces 12 may assume a variety of angular positions with respect to the plane passing through the other surfaces 12 and to assume a variety of angular positions with respect to a selected plane passing through the frame or platform of FIGURES 4 and 5 or a selected plane passing through the object or load placed upon the platform 45. This not only permits the system to traverse a surface which has irregularities but also compensates for any deflection in the frame or platform caused by loading.

Referring now to FIGURE 3, it will be noted that the center of the spherical bearing surface is positioned on the opposite side of the surface over which the system is to operate from the bearing surfaces themselves, assuming, of course, that the gap between the flat surfaces 12 and the surface on which the system is supported is in the normal operating range of a few thousandths of an inch. Assuming that the device of FIGURE 3 is moving along a surface from right to left in the drawing and it encounters a raised irregularity in the supporting surface, a force will be imparted to the member 10 acting from right to left. This force will in turn impart a rotational moment to the member about the center of the spherical bearing surfaces which will cause the leading edge of the member 10 to be raised so that the surface 12 will ride over the irregularity. The exact positioning of the center of the spherical bearing surface is not critical except it must be located below the plane of the surface 12 as shown in FIGURE 3 so that the moment imparted by the force created when a raised surface irregularity is encountered will raise the forward edge of the member. If, for example, the center of the curved bearing surface were located above the plane of the substantially flat surface 12, the leading edge of the member 10 would be rotated downwardly and would dig into the raised irregularity rather than sliding over it.

Thus, the present invention provides a vibrationless gas pressure levitation device and system which is capable of supporting loads with a high degree of efficiency so that the loads may be moved over a surface with relatively little power.

It will be understood that the invention is not to be limited to the exact construction shown and described, but that various changes and modifications may be made without departing from the spirit and scope of the invention, as defined in the appended claims.

What is claimed is:

1. A gas pressure levitation device comprising a bearing member having a substantially flat bearing surface and a curved bearing surface, said bearing member having a plurality of nozzles positioned therein terminating at said substantially flat bearing surface, means for supplying said nozzles with a compressed gas, and means having a curved bearing surface adapted to be affixed to an object to be supported, said last mentioned curved bearing surface being complementary to the curved bearing surface on said bearing member and positioned thereagainst so that relative motion may take place between said bearing member and the object to be supported about said curved bearing surface, the center of the curved bearing surfaces being located on the opposite side of said substantially flat bearing surface from the curved bearing surfaces.

2. In a gas pressure levitation device affixed to an object for supporting the object in spaced relationship from a surface by means of a thin layer of gas under pressure between said device and said surface so that relative motion may take place between said object and said surface under substantially frictionless conditions, the combination comprising a first member having a substantially flat surface, said first member having a plurality of nozzles positioned therein terminating at said substantially flat surface, means for supplying said nozzles with a gas under pressure, said first member having a spherical bearing surface, a second member affixed to said object and having a complementary spherical bearing surface engaging the spherical bearing surface of said first member, said substantially flat surface of said first member being positioned in opposed relationship to said first mentioned surface, the center of said spherical bearing surfaces being located on the opposite side of said substantially flat surface from the spherical bearing surfaces, whereby a thin film of gas under pressure is formed between the two opposed surfaces for supporting the object in spaced relationship to said first mentioned surface and whereby the plane of the flat surface of said first member may assume various angular positions with respect to a plane passing through said object.

3. In a gas pressure levitation device affixed to an object for supporting the object in spaced relationship from a surface by means of a thin layer of gas under pressure between said device and said surface, the combination comprising a first member having a substantially flat surface, said first member having a plurality of nozzles positioned therein terminating at said substantially flat surface, means for supplying said nozzles with a gas under pressure, a spherical bearing surface positioned on said first member, a second member affixed to the object to be supported and having a complementary spherical bearing surface engaging the spherical bearing surface of said first member, the center of said spherical bearing surfaces being located on the opposite side of said substantially flat surface from the spherical bearing surfaces, a collar affixed to said first member and surrounding said second member in spaced relationship, a plurality of spring means operatively contacting said collar and said second member for urging the two spherical bearing surfaces into engagement, said substantially flat surface of said first member being positioned in opposed relationship to said first mentioned surface whereby a thin film of gas under pressure is formed between the two opposed surfaces for supporting the object in spaced relationship from said first mentioned surface, and whereby the plane of the flat surface of said first member may assume various angular positions with respect to a plane passing through said object.

4. In a gas pressure levitation system for supporting an object in spaced relationship from a surface, means for supporting said object, a plurality of gas pressure levitation devices affixed to said means, each of said gas pressure levitation devices comprising a first member having a substantially flat surface, said first member having a plurality of nozzles positioned therein terminating at said substantially flat surface, means for supplying said nozzles with a gas under pressure, said first member having a spherical bearing surface, a second member affixed to said means for supporting the object and having a complementary spherical bearing surface engaging the spherical bearing surface of said first member, said substantially flat surfaces of each of said first members being positioned in opposed relationship to said first mentioned surface, the centers of said spherical bearing surfaces being located on the opposite side of said substantially flat surfaces from the spherical bearing surfaces, whereby a thin film of gas under pressure is formed between the opposed surfaces and whereby the planes of the substantially flat surfaces of each of said first members may assume various angular positions with respect to one another and to a plane passing through said object.

5. In a gas pressure levitation device affixed to an object for supporting the object in spaced relationship from a surface by means of a thin layer of gas under pressure between said device and said surface, the combination comprising a first member having a substantially flat surface, means for supplying said first member with a gas under pressure, said first member also having a spherical bearing surface, a second member affixed to said object and having a complementary spherical bearing surface engaging the spherical bearing surface of said first member, the center of said spherical bearing surfaces being located on the opposite side of said substantially flat surface from the spherical bearing surfaces, said substantially flat surface of said first member being positioned in opposed relationship to said first mentioned surface, means positioned in said first member and terminating at said substantially flat surface for producing a thin film of gas under pressure between the two opposed flat surfaces for supporting the object in spaced relationship from said first mentioned surface, said spherical bearing surfaces permitting the plane of the substantially flat surface of said first member to assume various angular positions with respect to a plane passing through said object.

6. In a gas pressure levitation system for supporting an object in spaced relationship from a surface, means for supporting said object, a plurality of gas pressure levitation devices affixed to said means, each of said gas pressure levitation devices comprising a first member having a substantially flat surface, means for supplying said first member with a gas under pressure, said first member having a spherical bearing surface, a second member affixed to said means for supporting said object and having a complementary spherical bearing surface engaging the spherical bearing surface of said first member, the center of said spherical bearing surfaces being located on the opposite side of said substantially flat surface from the spherical bearing surfaces, said substantially flat surface of each of said fist members being positioned in opposed relationship to said first mentioned surface, means positioned in said first member and terminating at said substantially flat surface for producing a thin film of gas under pressure between the opposed flat surfaces, the spherical bearing surfaces permitting the planes of the flat surfaces of each of said first members to assume various angular positions with respect to one another and to a plane passing through said object.

References Cited in the file of this patent
UNITED STATES PATENTS

| | | |
|---|---|---|
| 1,411,597 | Trask | Apr. 4, 1922 |
| 1,597,477 | Panhorst | Aug. 24, 1926 |
| 1,698,482 | Nicin | Jan. 8, 1929 |
| 2,511,979 | Goddard | June 20, 1950 |
| 2,727,784 | Hansen | Dec. 20, 1955 |
| 2,938,590 | Barnett | May 31, 1960 |

OTHER REFERENCES

"The Iron Age"; issue of April 3, 1958; pages 68, 71.